US009179017B2

(12) United States Patent
Hirose (10) Patent No.: US 9,179,017 B2
(45) Date of Patent: Nov. 3, 2015

(54) IMAGE PROCESSING APPARATUS AND METHOD FOR PROCESSING AN IMAGE WHICH UTILIZES A FIRST MODE FOR INSTRUCTIONS FROM THE IMAGE PROCESSING APPARATUS AND A SECOND MODE FOR INSTRUCTIONS RECEIVED FROM AN EXTERNAL APPARATUS AND FOR INSTRUCTIONS FROM THE IMAGE PROCESSING APPARATUS (71) Applicant: CANON KABUSHIKI KAISHA, Tokyo (JP)

(72) Inventor: Ayako Hirose, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 13/903,578

(22) Filed: May 28, 2013

(65) Prior Publication Data
US 2013/0329242 A1 Dec. 12, 2013

(30) Foreign Application Priority Data
Jun. 8, 2012 (JP) ................................ 2012-131300

(51) Int. Cl.
*G06F 3/12* (2006.01)
*H04N 1/00* (2006.01)

(52) U.S. Cl.
CPC ....... *H04N 1/00222* (2013.01); *H04N 1/00973* (2013.01); *H04N 1/00464* (2013.01); *H04N 1/00474* (2013.01); *H04N 2201/0075* (2013.01); *H04N 2201/0082* (2013.01); *H04N 2201/0091* (2013.01); *H04N 2201/0093* (2013.01); *H04N 2201/0094* (2013.01)

(58) Field of Classification Search
CPC .......... H04N 1/00222; H04N 1/00973; H04N 1/00464; H04N 1/0093
See application file for complete search history.

(56) References Cited

U.S. PATENT DOCUMENTS

2007/0256020 A1\* 11/2007 Haga .............................. 715/741
2009/0190157 A1\* 7/2009 Ferlitsch ...................... 358/1.15

FOREIGN PATENT DOCUMENTS

JP 2006-086642 A 3/2006

\* cited by examiner

*Primary Examiner* — Benny Q Tieu
*Assistant Examiner* — Sunil Chacko
(74) *Attorney, Agent, or Firm* — Canon U.S.A., Inc., IP Division (57) ABSTRACT A processing apparatus capable of connecting to an external apparatus includes a reception unit that receives an instruction to the processing apparatus regarding a process from the external apparatus, an instruction unit that instructs the processing apparatus to execute a process, and a setting unit that sets a type of process to be executed when the instruction unit has made an instruction. In a first mode, the process based on the instruction from the instruction unit is executed and in a second mode, the process based on the instruction from the instruction unit and the process based on the instruction received by the reception unit are executed. After the second mode is cancelled and the first mode is established, the setting unit sets a predetermined type of process as the type of process to be executed when the instruction unit has made an instruction.

17 Claims, 6 Drawing Sheets

IMAGE PROCESSING APPARATUS AND METHOD FOR PROCESSING AN IMAGE WHICH UTILIZES A FIRST MODE FOR INSTRUCTIONS FROM THE IMAGE PROCESSING APPARATUS AND A SECOND MODE FOR INSTRUCTIONS RECEIVED FROM AN EXTERNAL APPARATUS AND FOR INSTRUCTIONS FROM THE IMAGE PROCESSING APPARATUS

BACKGROUND OF THE INVENTION

1. Field of the Invention

The present invention relates to an image processing apparatus capable of connecting to an external apparatus, a method for processing an image, and a program.

2. Description of the Related Art

It is known that, in an image processing apparatus capable of connecting to an external apparatus such as a personal computer (PC) or a server, data is communicated between the apparatuses by directly operating the image processing apparatus and operating the image processing apparatus using the external apparatus in order to execute processes. For example, a method for processing information has been proposed in which an external apparatus including a web browser obtains an operation screen from an image forming apparatus including a web server and displays data regarding the operation screen in order to operate the image forming apparatus (Japanese Patent Laid-Open No. 2006-086642). In the method for processing information disclosed in Japanese Patent Laid-Open No. 2006-086642, a user may operate the image forming apparatus using a terminal apparatus including a web browser owned thereby and the image forming apparatus itself.

In Japanese Patent Laid-Open No. 2006-086642, however, when the image forming apparatus is operated using the external apparatus, the operability is not satisfactory and therefore it is inconvenient since the operation is performed using only the external apparatus. For example, when an image processing apparatus having a scanning function is to execute scanning, the user sets a document on the image processing apparatus after selecting and setting the function using the external apparatus, and then needs to make an instruction to begin execution of the scanning using the external apparatus again, which is cumbersome.

SUMMARY OF THE INVENTION

An aspect of the present invention provides a processing apparatus and a method for processing a processing apparatus that solve the problem in the example of the related art. Another aspect provides a processing apparatus, a method for processing a processing apparatus, and a program that improve the operability for the user.

A processing apparatus in the present invention is a processing apparatus capable of connecting to an external apparatus. The processing apparatus includes a reception unit configured to receive an instruction to the processing apparatus regarding a process from the external apparatus, an instruction unit configured to instruct the processing apparatus to execute a process, and a setting unit configured to set a type of process to be executed at a time when the instruction unit has made an instruction. The processing apparatus includes a first mode in which the process based on the instruction made by the instruction unit is executed and a second mode in which the process based on the instruction made by the instruction unit and the process based on the instruction received by the reception unit are executed. After the second mode is cancelled and the first mode is established, the setting unit sets a predetermined type of process as the type of process to be executed at a time when the instruction unit has made an instruction.

Further features of the present invention will become apparent from the following description of exemplary embodiments with reference to the attached drawings.

DESCRIPTION OF THE EMBODIMENTS

Figure 1:
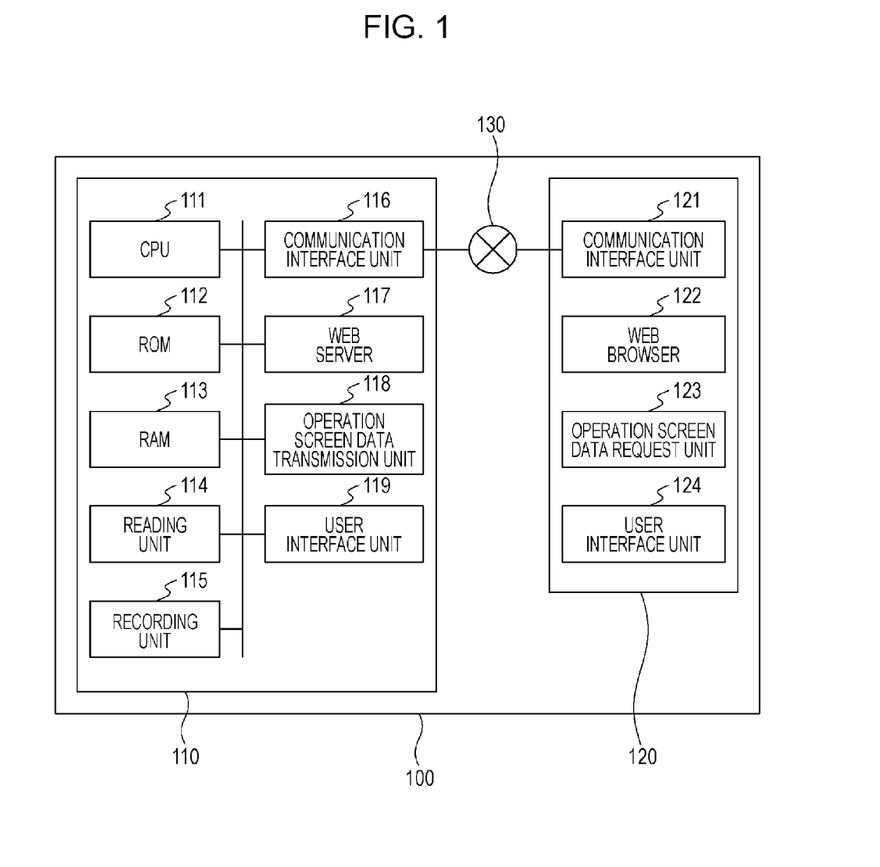
FIG. 1 is a diagram illustrating the configuration of an image processing system according to a first embodiment.

FIG. 1 is a diagram illustrating an example of the configuration of an image processing system according to a first embodiment.

An image processing system 100 includes an image processing apparatus 110 and a terminal apparatus 120, which are connected to each other through a wired or wireless network 130. That is, the terminal apparatus 120 is provided outside the image processing apparatus 110.

As the image processing apparatus 110, for example, a copying machine capable of connecting to a network, a printer, a fax machine, or a multifunction peripheral (MFP) having a plurality of functions such as a scanning function, a printing function, and a fax function may be used. In the present embodiment, an MFP is taken as an example of the image processing apparatus 110.

The image processing apparatus 110 includes a CPU 111 that controls the entirety thereof, a read-only memory (ROM) 112 that stores programs and data, and a random-access memory (RAM) 113 configured by a temporary storage region such as an image memory or the like. The image processing apparatus 110 further includes a reading unit 114, a recording unit 115, a communication interface unit 116, a web server 117, an operation screen data transmission unit 118, and a user interface unit 119.

The ROM 112 holds programs regarding control procedures and processing procedures performed by the CPU 111 and the like, and the RAM 113 holds information and work areas necessary for control processes performed by the image processing apparatus 110 and the like. The CPU 111 controls the entirety of the image processing apparatus 110 by operating in accordance with the information stored in the ROM 112 and the RAM 113.

The reading unit 114 reads images, and the recording unit 115 records images. The image processing apparatus 110 according to the present embodiment has three functions, namely copying of an image, scanning of an image, and multi-crop copying of an image, by including the reading unit 114 and the recording unit 115. In the following description, the copying function refers to a function of reading an image of a document using the reading unit 114 and recording the image on one or more pieces of recording paper using the recording unit 115. The scanning function refers to a function of transmitting an image of a document read by the reading unit 114 to the terminal apparatus 120. The multi-crop copying function refers to a function of automatically detecting a plurality of documents when the plurality of documents have been set on a platen glass and causing the recording unit 115 to record images of the plurality of documents on the same number of pieces of recording paper as the number of documents, respectively.

The communication interface unit 116 is configured in such a way as to enable the image processing apparatus 110 to communicate with the terminal apparatus 120 through the network 130.

The web server 117 transmits a web page through the network 130 in accordance with a request from a web browser. In addition, the web server 117 receives an instruction to execute a process transmitted from the web browser of a terminal apparatus 120 to the image processing apparatus 110.

The operation screen data transmission unit 118 transmits data (web page) regarding an operation screen for operating the image processing apparatus 110 in accordance with a request for the data regarding an operation screen from the web browser.

The user interface unit 119 enables a user to input certain instructions and display various pieces of information. The user makes instructions and settings to the image processing apparatus 110 through the user interface unit 119. Details of the configuration of the user interface unit 119 will be described later.

The terminal apparatus 120 is an apparatus that includes a web browser and that may operate the image processing apparatus 110 through the network 130, and, for example, may be one of various devices such as a personal computer (PC) and a smartphone. A general-purpose web browser may be used as the web browser.

The terminal apparatus 120 includes a communication interface unit 121 and a web browser 122. The terminal apparatus 120 further includes an operation screen data request unit 123 and a user interface unit 124 as a function of the web browser 122.

The communication interface unit 121 is configured in such a way as to enable the terminal apparatus 120 to communicate with the image processing apparatus 110 through the network 130.

The web browser 122 is a network client, and may download certain files (web pages such as HyperText Markup Language (HTML) files) such as data regarding an operation screen through the network 130 and display the certain files. In the present embodiment, the web browser 122 has a function of displaying data regarding an operation screen, selecting and setting the function of the image processing apparatus 110 through the data regarding an operation screen, and transmitting results of the selection and setting to the web server 117.

The operation screen data request unit 123 requests data regarding an operation screen from the operation screen data transmission unit 118 of the image processing apparatus 110.

The user interface unit 124 enables the user to input certain instructions and displays various pieces of information. The user makes instructions and settings to the terminal apparatus 120 and the image processing apparatus 110 through the user interface unit 124. That is, by operating the user interface unit 124, the user may make instructions and settings as to the operation of the image processing apparatus 110, which will be described later in detail.

As described above, the image processing system 100 includes the image processing apparatus 110 including the web server 117 and the terminal apparatus 120 including the web browser 122, and is configured such that the image processing apparatus 110 may be controlled using the terminal apparatus 120. In other words, in the image processing system 100, the image processing apparatus 110 may be controlled by an operation performed thereon and by an operation performed using the terminal apparatus 120.

More specifically, first, the communication interface unit 116 and the communication interface unit 121 are connected to each other through the network 130, and accordingly the web server 117 and the web browser 122 may communicate with each other. When the operation screen data request unit 123 of the terminal apparatus 120 has requested data regarding an operation screen from the image processing apparatus 110, the operation screen data transmission unit 118 of the image processing apparatus 110 transmits the data regarding an operation screen to the web browser 122 through the web server 117. The data regarding an operation screen received by the web browser 122 is displayed on the user interface unit 124 of the terminal apparatus 120. The user controls the image processing apparatus 110 by operating the user interface unit 124.

In the following description, the user interface unit 119 of the image processing apparatus 110 will be referred to as a "main user interface (UI)", and the user interface unit 124 on which data regarding an operation screen is displayed and with which the image processing apparatus 110 may be controlled will be referred to as a "web UI". In the image processing system 100, the image processing apparatus 110 may be controlled not only by operating the main UI but also by operating the web UI. In the present embodiment, the user may use the copying function by operating only the main UI. In addition, the user may use the three functions, namely the copying function, the scanning function, and the multi-crop copying function, by operating only the web UI or both the web UI and the main UI.

Figure 2:
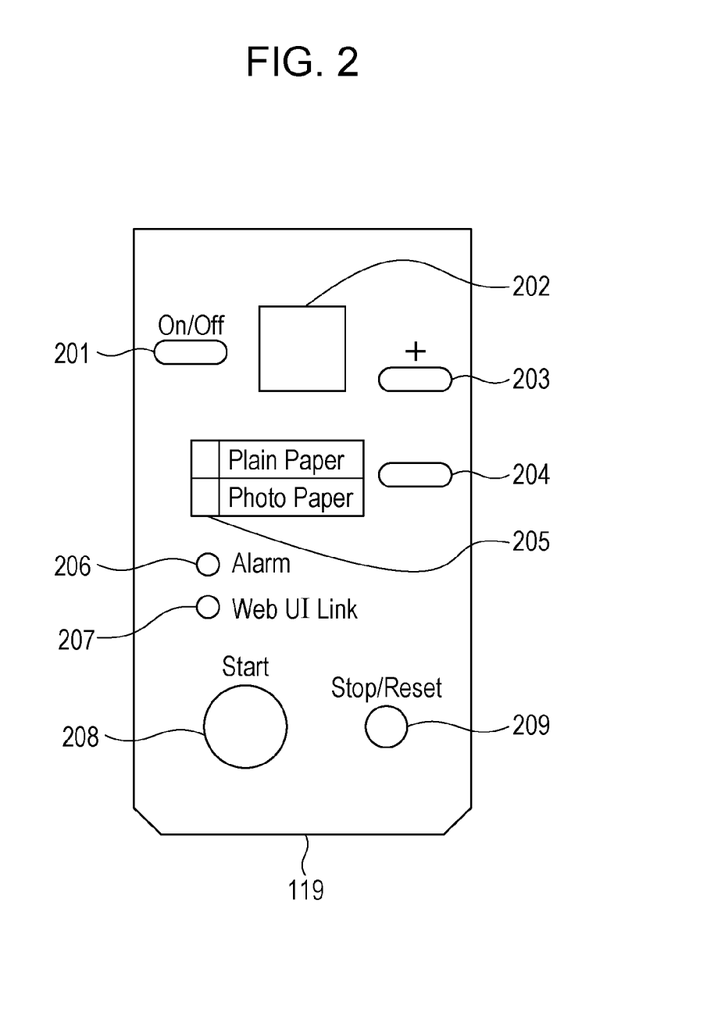
FIG. 2 is a diagram illustrating the configuration of a user interface unit of an image processing apparatus according to the first embodiment.

FIG. 2 is a diagram illustrating an example of the configuration of the main UI of the image processing apparatus according to the present embodiment.

As described above, the main UI (user interface unit 119) illustrated in FIG. 2 is configured in such a way as to enable the user to make certain instructions and settings to the image processing apparatus 110. The main UI includes a power key 201, a light-emitting diode (LED) display unit 202, a multiple copying setting key 203, a paper setting key 204, a paper setting lamp 205, an alarm lamp 206, a web UI link lamp 207, a start key 208, and a stop/reset key 209.

The power key 201 switches the power of the image processing apparatus 110 between on and off when pressed by the user.

The LED display unit 202 is a display unit that displays certain pieces of information to be provided for the user. For example, the LED display unit 202 displays certain pieces of information such as the number of copies to be printed and an error code, and when the image processing apparatus 110 is executing a scanning process or a printing process, displays an indication that the corresponding process is being executed.

The multiple copying setting key 203 is a setting unit used by the user to set the number of copies to be printed. The user may set a desired number of copies by pressing the multiple copying setting key 203 while checking the number of copies displayed on the LED display unit 202.

The paper setting key 204 is a setting unit used by the user to set the type of paper. The paper setting lamp 205 indicates the type of paper to be used for printing performed by the recording unit 115 for the user by turning on a lamp corresponding to the type of paper set. The user may set the type of paper such as plain paper or photographic paper by pressing the paper setting key 204 while checking the current setting with the paper setting lamp 205.

The alarm lamp 206 alarms the user. In the present embodiment, the alarm lamp 206 lights when an error has occurred in the image processing apparatus 110, in order to notify the user of the occurrence of the error.

The web UI link lamp 207 notifies the user of whether or not the image processing apparatus 110 and the web UI are cooperating. That is, the web UI link lamp 207 notifies the user of whether or not the image processing apparatus 110 is in a state in which a certain process according to an instruction from the terminal apparatus 120 may be executed. In the present embodiment, by turning on the web UI link lamp 207 when the image processing apparatus 110 and the web UI are cooperating, the user is notified of the cooperation between the image processing apparatus 110 and the web UI. In the following description, a state in which the main UI may be used as a unit for instructing the image processing apparatus 110 will be referred to as a first mode, and a state in which the main UI and the web UI may be simultaneously used as units for instructing the image processing apparatus 110 will be referred to as a second mode.

The start key 208 instructs the image processing apparatus 110 to begin one of various processes such as the scanning process and the printing process when pressed by the user. The stop/reset key 209 stops a process that is being executed by the image processing apparatus 110 halfway, resets settings such as the number of copies and the type of paper to their respective initial states, and cancels an error state when pressed by the user.

Figure 3:
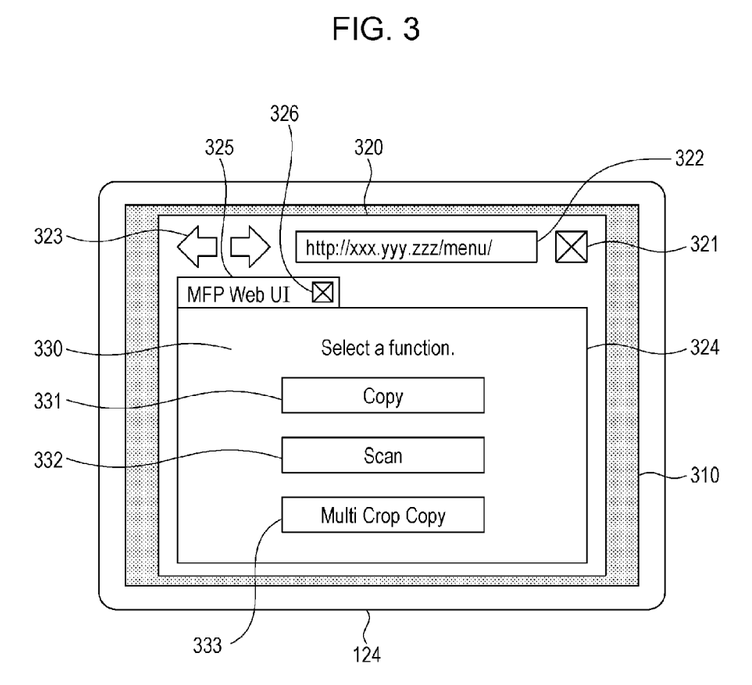
FIG. 3 is a diagram illustrating a state in which a user interface unit of a terminal apparatus according to the first embodiment has displayed a selection screen for selecting the type of process to be executed by the image processing apparatus.

FIG. 3 is a diagram illustrating a selection screen (function selection screen) displayed on the web UI according to the present embodiment for selecting the type of process to be executed by the image processing apparatus. As described above, the web UI is the user interface unit 124 capable of controlling the image processing apparatus 110. That is, the user interface unit 124 becomes the web UI by displaying data regarding an operation screen transmitted from the image processing apparatus 110 on a display unit 310.

The display unit 310 displays various pieces of information in order to use the function of the terminal apparatus 120. The display unit 310 illustrated in FIG. 3 adopts a touch panel method in which information is input when the user touches a region displayed on the display unit 310, such as a software key, but the present invention is not limited to this. For example, although the web UI is configured by the display unit 310 illustrated in FIG. 3 in the present invention, a hardware key for inputting information may be provided separately from the display unit 310.

When the web browser 122 of the terminal apparatus 120 has been activated, the display unit 310 displays a web browser display screen 320. The web browser display screen 320 includes a web browser closing key 321, an address bar 322, a page switching key 323, a web page display section 324, a tab 325, and a tab closing key 326.

The web browser closing key 321 closes the web browser when touched by the user.

The address bar 322 displays the uniform resource locator (URL) of a currently displayed web page.

The page switching key 323 switches the displayed page when pressed by the user. For example, the page switching key 323 is used when the user desires to display again a web page that has been previously displayed.

The web page display section 324 displays the content of a web page. In FIG. 3, a function selection screen 330 is displayed as an example of the operation screen of the image processing apparatus 110.

The function selection screen 330 is displayed when a web page corresponding to the function selection screen 330 has been obtained from the image processing apparatus 110 by inputting information (the IP address of the image processing apparatus 110 or the like) for identifying the image processing apparatus 110 to the address bar 322. The function selection screen 330 displays three software keys, namely a copying function selection key 331, a scanning function selection key 332, and a multi-crop copying function selection key 333. The user may select the function to be executed by the image processing apparatus 110 by touching one of these keys. For example, when the user has touched the copying function selection key 331, the image processing apparatus 110 is requested to transmit a web page corresponding to a copying function selection screen, and a copying screen is displayed on the web page display section 324 on the basis of the obtained web page.

In FIG. 3, a tab browser is illustrated as the web browser as an example, and therefore the tab 325 and the tab closing key 326 are included. The web page currently displayed on the display unit 310 may be closed by touching the tab closing key 326 or the web browser closing key 321.

Figure 4:
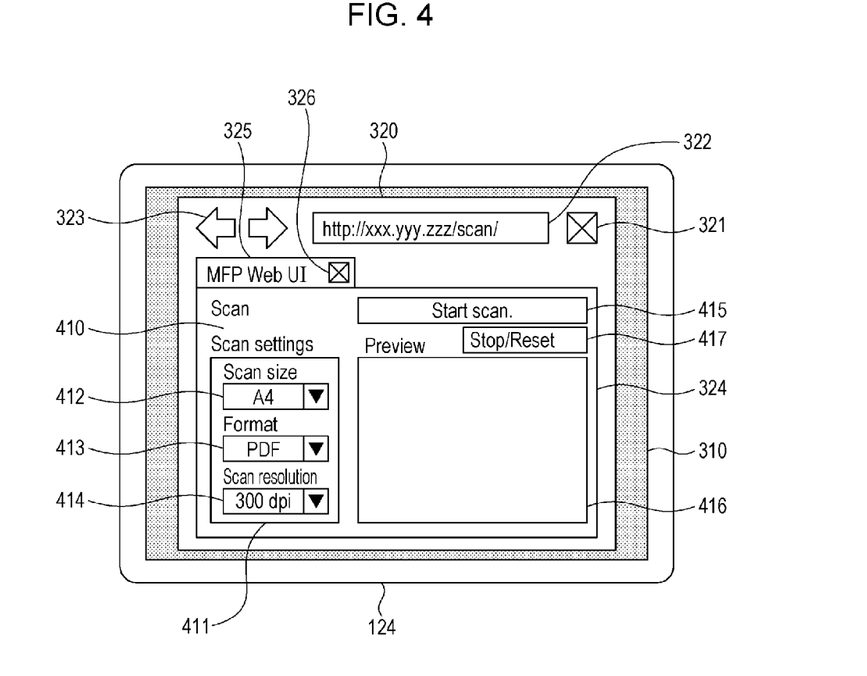
FIG. 4 is a diagram illustrating a state in which the user interface unit of the terminal apparatus according to the first embodiment has displayed a scanning screen.

FIG. 4 is a diagram illustrating a scanning screen displayed on the web UI according to the present embodiment. A scanning screen 410 illustrated in FIG. 4 is displayed when the scanning function has been selected using the scanning function selection key 332 of the function selection screen 330. When the scanning function has been selected using the scanning function selection key 332, the web browser 122 requests the image processing apparatus 110 to transmit a web page corresponding to a scanning function selection screen, and obtains the web page. Thus, a scanning screen is displayed on the web page display section 324 of the web browser display screen 320 on the basis of the obtained web page. A display unit 310, a web browser display screen 320, a web browser closing key 321, an address bar 322, a page switching key 323, a web page display section 324, a tab 325, and a tab closing key 326 illustrated in FIG. 4 are the same as those illustrated in FIG. 3, and accordingly description thereof is omitted.

The scanning screen 410 includes a scanning setting section 411, a scanning start key 415, a preview image display section 416, and a stop/reset key 417.

The scanning setting section 411 is a section in which various types of setting relating to the scanning process are made, and includes a read size setting portion 412, a data format setting portion 413, and a resolution setting portion 414. In each of these setting portions of the scanning setting section 411, setting may be changed by touching a pull-down menu.

The scanning start key 415 instructs the image processing apparatus 110 to begin the scanning process when touched by the user.

The preview image display section 416 displays an image obtained as a result of scanning performed by the image processing apparatus 110 when the scanning process has been completed.

The stop/reset key 417 instructs the image processing apparatus 110 to stop or reset the scanning process when touched by the user.

When the scanning function has been selected using the web UI illustrated in FIG. 3, the scanning screen 410 illustrated in FIG. 4 is displayed on the display unit 310 of the user interface unit 124. In this case, it is possible to instruct the image processing apparatus 110 to begin the scanning process using the start key 208 of the main UI or the scanning start key 415 of the web UI while the scanning screen 410 is displayed on the display unit 310. Although the scanning screen displayed on the web UI has been described with reference to FIG. 4, the copying screen or a multi-crop copying screen is displayed on the web page display section 324 when the copying function or the multi-crop copying function, respectively, has been selected in the function selection screen 330 illustrated in FIG. 3. In this case, it is possible to instruct the image processing apparatus 110 to begin the copying process or the multi-crop copying process using the start key 208 of the main UI or the scanning start key 415 of the web UI.

When the function to be executed by the image processing apparatus 110 has been selected using the web UI and an operation screen regarding the function selected for the image processing apparatus 110 is displayed as illustrated in FIG. 4, the CPU 111 controls the image processing apparatus 110 such that the web UI and the main UI cooperate. Therefore, the function assigned to (function set to) the start key 208 of the main UI is changed in accordance with the function (scanning function in the present embodiment) selected using the web UI. In doing so, it becomes possible to instruct the image processing apparatus 110 to begin a process (scanning in the present embodiment) using the web UI or the main UI while the web UI is being operated. That is, while the web UI is being operated, the main UI and the web UI may be simultaneously used as units for instructing the image processing apparatus 110 since the main UI and the web UI are cooperating. In other words, while the web UI is being operated, the image processing apparatus 110 is in the second mode, and accordingly the main UI and the web UI may be simultaneously used as units for instructing the image processing apparatus 110.

In the present embodiment, the user may check, using the main UI, whether or not the web UI and the main UI are cooperating. That is, the user may check, using the main UI, whether or not the image processing apparatus 110 is in the second mode. More specifically, when the web UI and the main UI are cooperating, the web UI link lamp 207 illustrated in FIG. 2 lights.

When the web browser has been closed by touching the web browser closing key 321, or when a page other than a web page for operating the image processing apparatus 110 has been displayed, the CPU 111 controls the image processing apparatus 110 such that the web UI and the main UI do not cooperate. By canceling the cooperation between the web UI and the main UI, the image processing apparatus 110 returns to the first mode from the second mode. The CPU 111 then controls the image processing apparatus 110 such that the function assigned to the start key 208 of the main UI is reset to a default state. In doing so, the image processing apparatus 110 may use the copying function set as a basic function in the present embodiment.

Even while the web UI and the main UI are cooperating, the cooperation between the web UI and the main UI may be cancelled by an instruction from the main UI when the image processing apparatus 110 is not realizing the selected function and is in a waiting state.

Figure 5A:
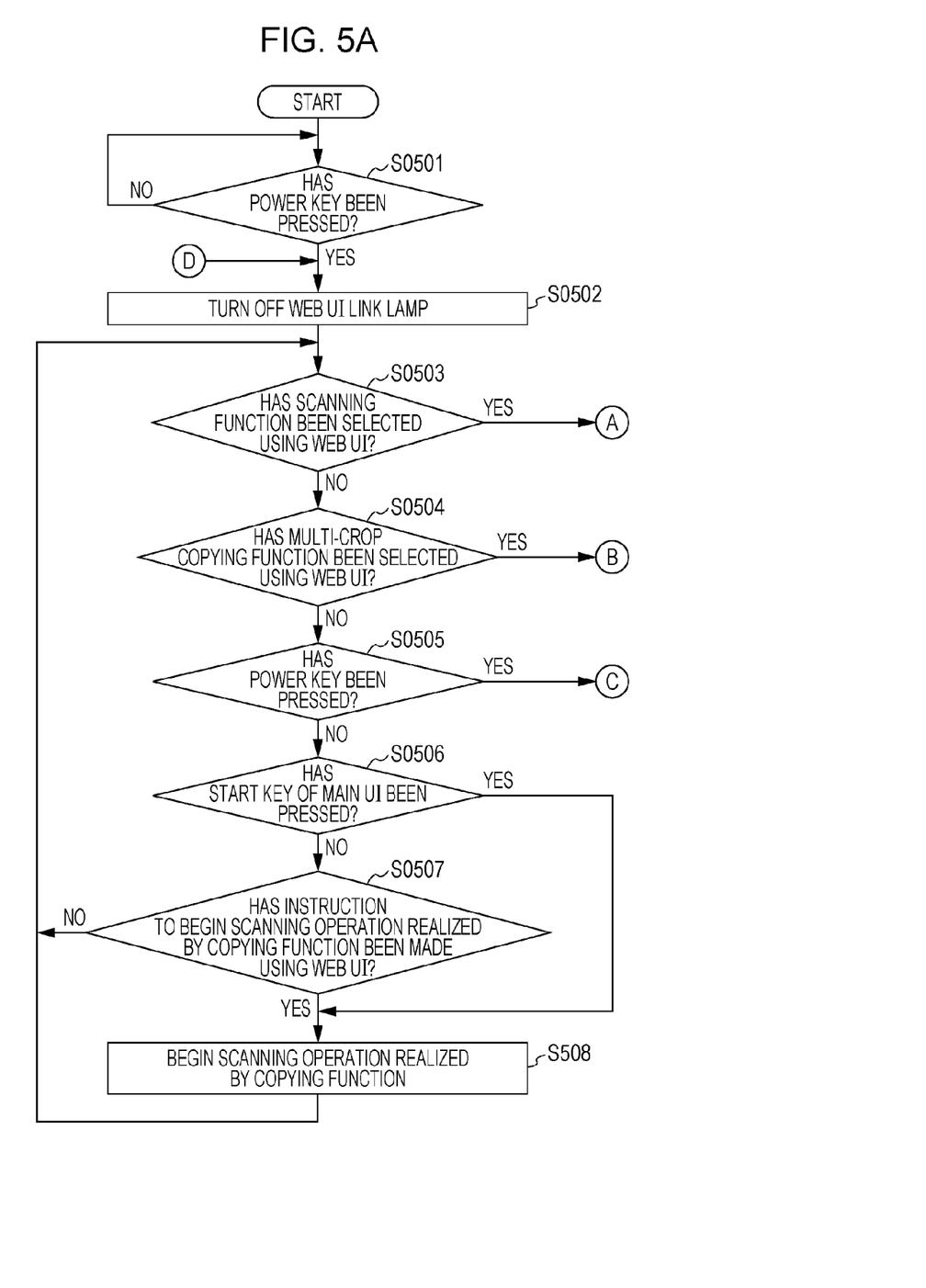
FIGS. 5A and 5B are flowcharts illustrating an operation to be executed by a central processing unit (CPU) of the image processing apparatus according to the first embodiment.
Figure 5B:
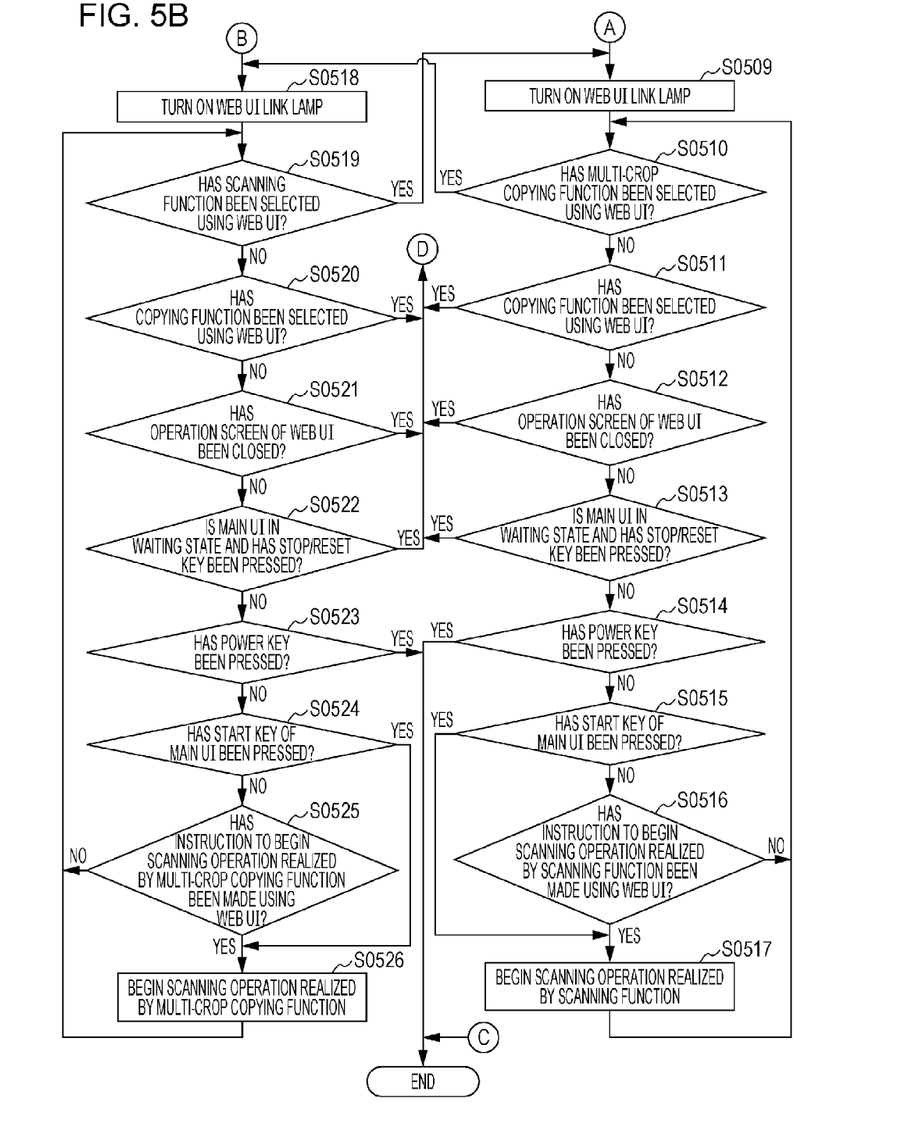

FIGS. 5A and 5B are flowcharts illustrating an example of a process executed by the CPU 111 in order to determine the function to be executed by the image processing apparatus 110 in the present invention.

First, whether or not the power of the user interface unit 119 of the image processing apparatus 110 has been turned on is determined (S0501). In the present embodiment, whether or not the power key 201 has been pressed is determined. If it is determined that the power of the user interface unit 119 has been turned on, the process proceeds to S0502. On the other hand, if it is not determined that the power has been turned on, S0501 is executed again.

In S0502, the web UI link lamp 207 is turned off. Thereafter, the terminal apparatus 120 opens the web browser and accesses the image processing apparatus 110, in order to display data regarding an operation screen and make it possible to control the image processing apparatus 110. When it is accessed to the image processing apparatus 110 through the web browser, the user interface unit (main UI) and the web browser (web UI) is able to cooperate. While the web UI link lamp 207 is turned off, an instruction to execute the copying function, which is the default setting, is assigned to the start key 208. That is, the copying function is set to the start key 208.

In S0503, whether or not the scanning function has been selected using the web UI is determined. In the present embodiment, whether or not transmission of the web page corresponding to the scanning function has been requested is determined by determining whether or not the scanning function selection key 332 has been touched in the function selection screen 330 of the web UI illustrated in FIG. 3. If it is not determined that the scanning function has been selected, the process proceeds to S0504, and if it is determined that the scanning function has been selected, the process proceeds to S0509.

In S0504, whether or not the multi-crop copying function has been selected using the web UI is determined. In the present embodiment, whether or not transmission of the web page corresponding to the multi-crop copying function has been requested is determined by determining whether or not the multi-crop copying function selection key 333 has been touched in the function selection screen 330 of the web UI. If it is not determined that the multi-crop copying function has been selected, the process proceeds to S0505, and if it is determined that the multi-crop copying function has been selected, the process proceeds to S0518.

In S0505, whether or not the power of the user interface unit 119 of the image processing apparatus 110 has been turned off is determined. In the present embodiment, whether or not the power key 201 has been pressed is determined as in S0501. If it is not determined that the power key 201 has been pressed, the process proceeds to S0506, and if it is determined that the power key 201 has been pressed, the process ends.

In S0506, whether or not an instruction to begin the process of the copying function has been made using the main UI is determined. In the present embodiment, whether or not the start key 208 of the main UI has been pressed is determined. If it is determined that the start key 208 has been pressed, the process proceeds to S0508, and a scanning process realized by the copying function begins (the copying process is executed). On the other hand, if it is not determined that the start key 208 has been pressed, the process proceeds to S0507.

In S0507, whether or not an instruction to begin the scanning process realized by the copying function has been made using the web UI is determined. If it is determined that an instruction to begin the scanning process realized by the copying function has been made, the process proceeds to S0508, and the scanning process realized by the copying function begins. On the other hand, if it is not determined that an instruction to begin the scanning process realized by the copying function has been made, the process proceeds to S0503.

After the scanning process realized by the copying function begins in S0508, the process proceeds to S0503.

In S0509, the web UI link lamp 207 is turned on. As a result, the user may confirm, using the main UI, that the web UI and the main UI are cooperating. In addition, an instruction to begin scanning realized by the scanning function is assigned to the start key 208. That is, the scanning function is set to the start key 208. After executing S0509, the process proceeds to S0510.

In S0510, whether or not the multi-crop copying function has been selected using the web UI is determined as in S0504. If it is not determined that the multi-crop copying function has been selected, the process proceeds to S0511. On the other hand, if it is determined that the multi-crop copying function has been determined, the process proceeds to S0518.

In S0511, whether or not the copying function has been selected using the web UI is determined. In the present embodiment, whether or not transmission of the web page corresponding to the copying function has been requested is determined by determining whether or not the copying function selection key 331 has been touched in the function selection screen 330 displayed on the web UI illustrated in FIG. 3. If it is not determined that the copying function has been selected, the process proceeds to S0512. On the other hand, if it is determined that the copying function has been selected, an instruction to begin copying realized by the copying function is assigned to the start key 208, and the process proceeds to S0502.

In S0512, whether or not the operation screen displayed on the web UI has been closed is determined. In the present embodiment, whether or not the tab closing key 326 of the tab 325 or the web browser closing key 321 corresponding to the operation screen of the image processing apparatus 110 has been touched using the web UI illustrated in FIG. 3 is determined. If it is not determined that the operation screen displayed on the web UI has been closed, the process proceeds to S0513. On the other hand, if it is determined that the operation screen displayed on the web UI has been closed, the process proceeds to S0502, and an initial state is established.

In S0513, whether or not the main UI is in a waiting state and the stop/reset key 209 has been pressed is determined. In the present embodiment, it is determined that the main UI is in a waiting state if the main UI has not begun a process set using the web UI and the LED display unit 202 does not indicate that the process is being executed. If it is not determined that the main UI is in a waiting state and the stop/reset key 209 has been pressed, the process proceeds to S0514. On the other hand, if it is determined that the main UI is in a waiting state and the stop/reset key 209 has been pressed, the process proceeds to S0502, and the initial state is established.

In S0514, whether or not the power of the user interface unit 119 of the image processing apparatus 110 has been turned off. In the present embodiment, whether or not the power key 201 has been pressed is determined as in S0501. If it is not determined that the power key 201 has been pressed, the process proceeds to S0515. On the other hand, if it is determined that the power key 201 has been pressed, the process ends.

In S0515, whether or not an instruction to begin the process of the scanning function has been made using the main UI is determined. In the present embodiment, whether or not the start key 208 of the main UI has been pressed is determined as in S0506. If it is determined that the start key 208 has been pressed, the process proceeds to S0517, and the scanning process realized by the scanning function begins (the scanning process is executed). On the other hand, if it is not determined that the start key 208 has been pressed, the process proceeds to S0516.

In S0516, whether or not an instruction to begin the scanning process realized by the scanning function has been made using the web UI is determined. In the present embodiment, whether or not the scanning start key 415 has been touched in the scanning screen 410 of the web UI is determined. If it is determined that an instruction to begin the scanning process realized by the scanning function has been made, the process proceeds to S0517, and the scanning process realized by the scanning function begins. On the other hand, if it is not determined that an instruction to begin the scanning process realized by the scanning function has been made, the process proceeds to S0510.

After the scanning process realized by the scanning function begins in S0517, the process proceeds to S0510.

In S0518, the web UI link lamp 207 is turned on. As a result, the user may confirm, using the main UI, that the web UI and the main UI are cooperating. In addition, an instruction to begin multi-crop copying realized by the multi-crop copying function is assigned to the start key 208. That is, the multi-crop copying function is set to the start key 208. After executing S0518, the process proceeds to S0519.

In S0519, whether or not the scanning function has been selected using the web UI is determined as in S0503. If it is not determined that the scanning function has been selected, the process proceeds to S0520. On the other hand, if it is determined that the scanning function has been selected, the process proceeds to S0509.

In S0520, whether or not the copying function has been selected using the web UI is determined as in S0511. If it is not determined that the copying function has been selected, the process proceeds to S0521. On the other hand, if it is determined that the copying function has been selected, an instruction to begin copying realized by the copying function is assigned to the start key 208, and the process proceeds to S0502.

In S0521, whether or not the operation screen displayed on the web UI has been closed is determined as in S0512. In the present embodiment, whether or not the tab closing key 326 of the tab 325 or the web browser closing key 321 corresponding to the operation screen of the image processing apparatus 110 has been touched using the web UI illustrated in FIG. 3 is determined. If it is not determined that the operation screen has been closed, the process proceeds to S0522. On the other hand, if it is determined that the operation screen has been closed, the process proceeds to S0502.

In S0522, whether or not the main UI is in the waiting state and the stop/reset key 209 has been pressed is determined as in S0513. If it is not determined that the main UI is in the waiting state and the stop/reset key 209 has been pressed, the process proceeds to S0523. On the other hand, if it is determined that the main UI is in the waiting state and the stop/reset key 209 has been pressed, the process proceeds to S0502.

In S0523, whether or not the power of the user interface unit 119 of the image processing apparatus 110 has been turned off is determined. In the present embodiment, whether or not the power key 201 has been pressed is determined as in S0501. If it is not determined that the power key 201 has been pressed, the process proceeds to S0524. On the other hand, if it is determined that the power key 201 has been pressed, the process ends.

In S0524, whether or not an instruction to begin the process of the multi-crop copying function has been made using the main UI is determined. In the present embodiment, whether or not the start key 208 of the main UI has been pressed is determined as in S0506. If it is determined that the start key 208 has been pressed, the process proceeds to S0526, and if it is not determined that the start key 208 has been pressed, the process proceeds to S0525.

In S0525, whether or not an instruction to begin the scanning process realized by the multi-crop copying function has been made using the web UI is determined. If it is determined that an instruction to begin the scanning process realized by the multi-crop copying function has been made, the process proceeds to S0526, and if it is not determined that an instruction has been made, the process proceeds to S0519.

After the scanning process realized by the multi-crop copying function begins (the multi-crop copying process is executed) in S0526, the process proceeds to S0519.

In the present embodiment, the process to be executed when the start key 208 of the main UI has been pressed is determined through the above-described control on the basis of the operation condition of the web UI, and therefore the user may make an instruction to begin the process using the main UI or the web UI, whichever the user prefers. That is, in the present embodiment, the type of process to be executed when the start key 208 of the main UI has been pressed is changed in accordance with an instruction made using the web UI, execution of the set type of process may be begun by pressing the start key 208 of the main UI or by making an instruction to begin the operation using the web UI, whichever the user prefers.

In addition, the user may reset the process to be executed at a time when the start key 208 of the main UI has been pressed to a state (default state) before the operation screen displayed on the web UI is opened by closing the operation screen.

The user may reset the process to be executed at a time when the start key 208 of the main UI to the state before the operation screen is opened by pressing the stop/reset key 209 while the main UI is in a waiting state.

As described above, by causing the main UI and the web UI to cooperate in accordance with the operation condition of the web UI, the main UI and the web UI may cooperate, thereby improving the operability for the user.

In the case of a configuration in which an image processing apparatus may be controlled only by a main UI or a web UI as in an example of the related art, the user needs to move between an image forming apparatus and a terminal apparatus. For example, when the user is to instruct the image processing apparatus to execute the scanning function using the web UI, the user sets a document on a platen glass of the image processing apparatus after selecting and setting the scanning function using the web UI, and then instructs the image processing apparatus to begin scanning using the web UI again. On the other hand, in the present embodiment, since the web UI and the main UI cooperate, even after the scanning function is selected and set using the web UI, the user may instruct the image processing apparatus to begin scanning not only using the web UI but also using the main UI, which is located close to the platen glass. Therefore, the operability for the user is satisfactory.

In the present embodiment, since the image processing apparatus 110 provides content for operating the image processing apparatus 110 using the web UI and the operation of the image processing apparatus 110 is managed in an integrated manner, it is easy to switch the function to be assigned to the start key 208 of the user interface unit 119.

In the present embodiment, since the web browser 122 included in the terminal apparatus 120 is used, the resource to be provided by the image processing apparatus 110 may be kept at minimum. Therefore, regions to be used by the ROM 112 and the RAM 113 may be secured. In addition, a plurality of functions need not be operated using the user interface (main UI) of the image processing apparatus 110, and accordingly an operation unit such as a hardware key need not be newly provided. That is, even if the image processing apparatus 110 includes a small number of operation units such as a hardware key, the user may easily operate a large number of functions. Therefore, even in the case of an MFP (image processing apparatus 110) that does not include a liquid crystal display or the like as in the present embodiment, the user may easily operate the MFP using the terminal apparatus 120. The operability may be further improved depending on the size of the display screen of the web browser 122 of the terminal apparatus 120.

Although an embodiment of the present invention has been described above, the basic configuration in the present invention is not limited to that described above.

Although a case in which the copying function is set as the default function of the image processing apparatus 110 has been described with reference to FIGS. 5A and 5B, the present invention is not limited to this, and, another function may be set as the default function.

The processing method used by the CPU 111 illustrated in FIGS. 5A and 5B is merely an example, and the processing method used by the CPU 111 is not limited to this. For example, the order in which S0503 to S0505, S0510 to S0514, and S0519 to S0523 are executed is not particularly limited. In addition, the order in which S0506 and S0507, S0515 and S0516, and S0524 and S0525 are executed may be reversed.

Although, in the first embodiment, the image processing apparatus 110 has the three functions, namely the copying function, the scanning function, and the multi-crop copying function, the present invention is not limited to this. For example, the image processing apparatus 110 may further have another function, or may have only one function.

Although the web UI link lamp 207 is configured to be turned on only while the scanning function or the multi-crop copying function is being used in the first embodiment, the present invention is not limited to this. When the copying function selection key 331 has been touched in the function selection screen 330 of the web UI illustrated in FIG. 3, the web UI link lamp 207 may be turned on. That is, the web UI link lamp 207 is turned on, when it is accessed to the image processing apparatus 110 through the web browser. The web UI link lamp 207 is turned on, when it is accessed to the image processing apparatus 110 through the web browser.

In addition, although the process to be executed when the start key 208 of the main UI has been pressed is determined on the basis of the operation condition of the web UI in the first embodiment, the process to be executed may be determined using a key different from the start key 208. For example, when a start key is not included in the main UI in the case of a single-function printer that does not have an incorporation function by which the image processing apparatus 110 operates independently, a reset key used to cancel an error state and the like may be used instead of the start key as a key for executing the type of process based on an instruction made using the web UI.

Although, in the first embodiment, the function assigned to the start key 208 of the main UI is controlled in such a way as to be reset to the default state when the web UI has been closed, that is, when the cooperation between the web UI and the main UI has been cancelled, the present invention is not limited to this. For example, the function assigned to the start key 208 of the main UI may be controlled in such a way as to be reset to the default state when the cooperation between the web UI and the main UI has been cancelled and a process has been executed in accordance with a set type of process (for example, use of the scanning function) or the process has been cancelled.

Although, in the image processing apparatus 110, a case in which the function of the image processing apparatus 110 cannot be selected, that is, a case in which the function cannot be selected using the user interface unit 119, has been described in the first embodiment, the image processing apparatus 110 may be configured such that the function may be selected using the image processing apparatus 110. When the function may be selected using the image processing apparatus 110, content specified using the main UI may be transmitted to the web UI, and content specified using the web UI may be transmitted to the main UI. For example, when the copying function has been set using the main UI while the scanning screen 410 is displayed on the web browser display screen 320, the web browser display screen 320 may be switched to a screen for making an instruction regarding the copying function. According to this configuration, for example, the type of process to be executed by the image processing apparatus 110 may be set using the main UI, and only an instruction to begin the process may be made using the web UI.

Although an instruction to execute the copying function is assigned, as the default setting, to the start key 208 when the image processing apparatus 110 is operated using the main UI in the first embodiment, the present invention is not limited to this. For example, when the function may be selected using the main UI, the function selected using the main UI may be assigned to the start key 208.

In addition, although, in the first embodiment, the main UI and the web UI cooperate and the selected function may be begun, stopped, or reset using the main UI or the web UI, whichever the user prefers, the present invention is not limited to this. For example, when there are a plurality of terminal apparatuses 120 and each of the plurality of terminal apparatuses 120 may operate the image processing apparatus 110, pressing of the stop/reset key 209 of the image processing apparatus 110 may be invalidated while the web UI of one of the plurality of the terminal apparatuses 120 is being used. That is, pressing of the start key 208 of the image processing apparatus 110 may be validated, but stopping or resetting of the operation using the stop/reset key 209 of the image processing apparatus 110 may be inhibited. By using such a configuration, when a plurality of users share the image processing apparatus 110, it is possible to avoid a situation in which a user stops or resets the operation of the image processing apparatus 110 that has been begun by another user. At this time, the users may be notified of a setting operation using a web UI by displaying "being set using a web UI" or the like on the main UI.

Although the present invention has been described by taking the image processing system 100 in which the image processing apparatus 110 and the terminal apparatus 120 are connected to each other through the network 130 as an example in the first embodiment, the present invention is not limited to this. For example, an image processing apparatus and a terminal apparatus may be connected to each other through a local interface or through near field communication.

Although the terminal apparatus 120 is configured in such a way as to be able to control the image processing apparatus 110 through the web UI, the present invention is not limited to this. For example, the terminal apparatus 120 may be configured in such a way as to be able to control the image processing apparatus 110 using an application including a program for controlling the image processing apparatus 110, instead of the web UI.

In addition, not all the above-described processes need to be realized by software, but some or all of the above-described processes may be realized by hardware.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-131300, filed Jun. 8, 2012, which is hereby incorporated by reference herein in its entirety.

What is claimed is:

1. A processing apparatus capable of performing a plurality of types of processes and connecting to an external apparatus, the processing apparatus comprising:
a reception unit configured to receive an instruction regarding a process to the processing apparatus from the external apparatus;
an instruction unit configured to instruct the processing apparatus to execute a process, the instruction unit being provided on the processing apparatus; and
a setting unit configured to set a type of process to the instruction unit from the plurality of types of processes in accordance with a type of process of the instruction received by the reception unit,
wherein the processing apparatus includes,
a first mode in which the processing apparatus is able to execute a predetermined type of process set to the instruction unit based on the instruction made by the instruction unit and a second mode in which a process based on the instruction made by the instruction unit and the a process based on the instruction received by the reception unit are able to be executed independently of each other,
wherein, if the processing apparatus is in the second mode, the type of process set to the instruction unit is changed in accordance with a type of process of the instruction received by the reception unit,
wherein, in a case where the setting unit sets the type of process based on the instruction received by the reception unit in the second mode, the type of process set by setting unit is able to be executed based on the instruction made by the instruction unit in the second mode, and wherein, after the second mode is cancelled and the first mode is established, the setting unit sets the predetermined type of process as the type of process to the instruction unit.

2. The processing apparatus according to claim 1, wherein, after the second mode is cancelled and the first mode is established, the setting unit sets the predetermined type of process as the type of process to the instruction unit in a case where the process has been executed in accordance with the set type of process or in a case where the process has been cancelled.

3. The processing apparatus according to claim 1, wherein, in the second mode, the type of process is able to be changed using each of the instruction made to the image processing apparatus and the instruction received by the reception unit.

4. The processing apparatus according to claim 1, further comprising:
a web server configured to transmit a web page for operating the process to be executed by the processing apparatus to the external apparatus,
wherein the reception unit receives the instruction from the external apparatus through the web page.

5. The processing apparatus according to claim 4, wherein the image processing apparatus transmits the web page to the external apparatus in accordance with a request from the external apparatus.

6. The processing apparatus according to claim 4, further comprising:
a control unit configured to perform control such that the second mode is established if a web page for operating the process to be executed by the image processing apparatus is displayed on the external apparatus.

7. The processing apparatus according to claim 4, wherein the second mode is able to be cancelled in a case where the web page for operating the process to be executed by the processing apparatus has been closed.

8. The processing apparatus according to claim 1, further comprising:
a display unit configured to indicate whether or not the second mode has been established.

9. The processing apparatus according to claim 1, further comprising:
a reading unit configured to read a document,
wherein the process includes a process for reading the document using the reading unit.

10. The processing apparatus according to claim 1, wherein, in the second mode, the type of process set by the setting unit is cancelled in accordance with the instruction made to the processing apparatus or the instruction received by the reception unit.

11. The processing apparatus according to claim 1, wherein the second mode is cancelled without requiring a logout of a user of the external apparatus when an instruction is made by the instruction unit in the second mode.

12. The processing apparatus according to claim 1, wherein the second mode is cancelled if an instruction is made by the instruction unit in the second mode.

13. The processing apparatus according to claim 1, wherein, if the second mode is established and then the setting unit sets a type of process to the instruction unit from the plurality of types of processes in accordance with a type of process of the instruction received by the reception unit, the processing apparatus executes the type of process set by the setting unit in a case where the instruction unit instructs the processing apparatus to execute a process.

14. The processing apparatus according to claim 1, wherein the instruction unit is a start key.

15. A method for controlling a processing apparatus capable of performing a plurality of types of processes and connecting to an external apparatus, the processing apparatus including an instruction unit configured to instruct the processing apparatus to execute a process, the method comprising the steps of:
receiving an instruction regarding a process to the processing apparatus from the external apparatus;
setting a type of process to the instruction unit from the plurality of types of processes in accordance with a type of process of the received instruction; and
causing the image processing apparatus to execute a process,
wherein the image processing apparatus includes,
a first mode in which the processing apparatus is able to execute a predetermined type of process set to the instruction unit based on the instruction made by the instruction unit, and
a second mode in which a process based on the instruction made by the instruction unit and a process based on the received instruction are able to be executed independently of each other,
wherein, if the processing apparatus is in the second mode, the type of process set to the instruction unit is changed in accordance with a type of process of the received instruction,
wherein, in a case where the type of process is set based on the received instruction in the second mode, the type of process being set based on the received instruction is able to be executed based on the instruction made by the instruction unit in the second mode, and
wherein the method further includes setting, after the second mode is cancelled and the first mode is established, the predetermined type of process as the type of process to the instruction unit.

16. A non-transitory computer-readable recording medium for causing a computer to execute the steps included in the method for processing an image according to claim 15.

17. The method for controlling a processing apparatus according to claim 16, wherein the second mode is cancelled without requiring a logout of a user of the external apparatus when an instruction is made in the second mode.

* * * * *